J. NOURSE.
PLOWS.

No. 194,257. Patented Aug. 14, 1877.

Witnesses,
Edwin A. Hildreth.
George E. Burt.

Inventor,
Joel Nourse

UNITED STATES PATENT OFFICE.

JOEL NOURSE, OF BOSTON, MASSACHUSETTS.

IMPROVEMENT IN PLOWS.

Specification forming part of Letters Patent No. 194,257, dated August 14, 1877; application filed August 4, 1876.

*To all whom it may concern:*

Be it known that I, JOEL NOURSE, of Boston, in the county of Suffolk and State of Massachusetts, have invented new and useful Improvements in Plows, which improvements are fully set forth in the following specification, reference being had to the accompanying drawings.

My invention relates to that class of plows usually known as "swivel-plows," in which the mold-board can be reversed from side to side to cut a furrow on either side of the plow.

In swivel-plows it is usual to provide a hook, which swings from a point near the base of the handles, and extends to the mold-board, and holds it in position on either side of the plow. When this hook is secured to or near the base of the handles it sometimes happens that it will hold the mold-board up tight and snug against one side of the standard, but will leave it loose or a little distance off from the standard upon the other side of the plow. In such cases it is necessary to move the staple which holds the hook toward the side where the mold-board is held most firmly, and to shorten the hook till the mold-board on both sides is held equally firm against the standard. In some cases the hooks come too short or too long, and have to be heated in order to shorten or lengthen them. It has been usual to provide a hole in the face of the mold-board, into which the hook was placed to secure the mold-board in position. In some sticky or adhesive soils the soil would cling to the mold-board in and around this hole, and sometimes spread over the surface of the mold-board to such an extent that it became a serious impediment in the use of the plow.

To obviate and overcome the above difficulties is the object of my invention.

The nature of my invention consists in so holding the mold-board in position on either side of the plow that the passage of the furrow-slice over the mold-board shall not be impeded by, nor be obliged to pass over, the hole into which the hook is placed which holds the mold-board in position; also, in so constructing the support from which the hook extends to the mold-board that the hook can be easily adjusted to hold the mold-board firmly against the standard on both sides of the plow; also, in so constructing the hook itself that its length can readily be varied, if necessary, so as to exactly reach the recess prepared for it in the mold-board.

Figure 1:
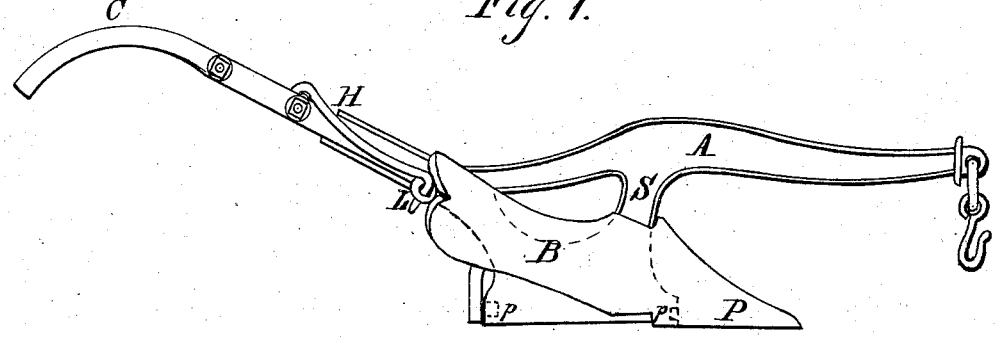
Figure 2:
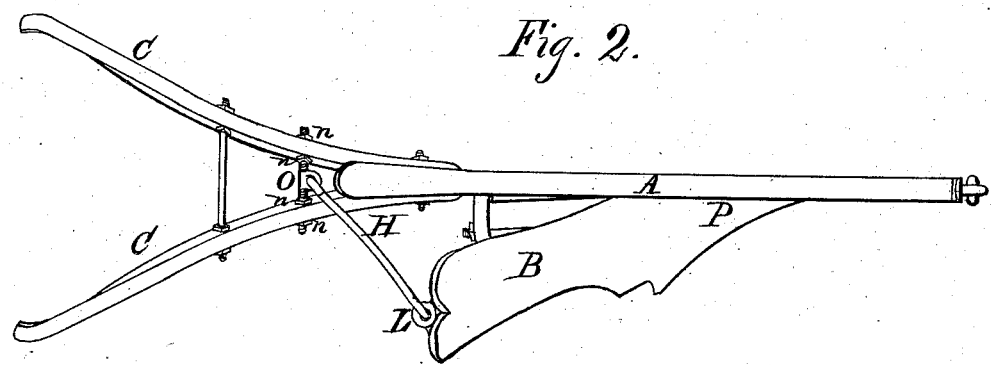

In the accompanying drawings, Figure 1 represents a side elevation of a plow with my improvements attached. Fig. 2 represents a top view of the same.

Like letters represent like parts in all the figures.

In the accompanying drawings, A represents the beam of the plow. B is the mold-board. P is the point. C C are the handles. The mold-board B is provided with a loop, L, in the swallow-tail, to receive the hook H, which holds the mold-board in posision on either side of the plow.

The mold-board and point are arranged to swing or revolve from one side of the plow to the other on pivots p p, much in the usual manner in swivel-plows.

S represents the standard of the plow. The hook H is secured to a cross-brace, O, as shown in Fig. 2. n n are nuts, by which the seat on the cross-brace O can be adjusted so as to swing the hook from the exact central point, so that the hook will reach the recess in the mold-board when the mold-board is in its proper position on either side of the plow.

To avoid all liability of the soil filling into the seat or hole prepared in the mold-board for the hook, and to prevent the soil from clinging in and around this hole and spreading over the surface of the plow, I place a loop in the swallow-tail of the mold-mold, and into this loop I pass the hook to hold the mold-board in its place.

By this arrangement the recess for receiving the hook is usually above the action of the furrow-slice, and is placed below the surface of the mold-board, so that a smooth unimpeded surface of mold-board is presented, and in some soils a plow so constructed will keep clean and clear, while even the usual hole in a common swivel-plow mold-board will cause the adhesive soil to clog first in and around the hook-recess, and afterward to spread over the surface of the mold-board.

In setting up swivel-plows it is sometimes found that the hook is too short on one side and too long on the other.

In such cases all that is necessary in my improved plow is to move the recess and cross-brace O, from which the hook swings, toward the side for which the hook is too short, or from the side upon which the mold-board has the most play. This can readily be accomplished, as the cross-brace O is formed with a thread on each end and nuts n n on each side of each plow-handle. By turning the four nuts n the cross-brace and hook can be adjusted to the exact central position.

The hook H is formed on a curve, so that it is only necessary to straighten the curve whenever it is found that the hook is too short, and the curve can be increased when the hook is too long. Thus, after the hook-seat O is adjusted to its central position the proper length of hook can readily be obtained without heating the hook either to increase or diminish its length.

It may seem a simple thing to adjust the hook-seat to its exact central position before attaching the hook to any ordinary swivel-plow, but the castings are liable to vary somewhat, and all the parts are dependent upon the perfection of their finish for exact fit, and it is very convenient to have a seat from which to swing the hook that can be adjusted to its proper position.

Having thus described the nature and operation of my invention, what I claim as new, and desire to secure by Letters Patent, is—

1. The combination of the loop L or seat for receiving the hook H with the swallow-tail or rear central portion of a swivel-plow mold-board, substantially as described, and for the purpose set forth.

2. The combination of the horizontally-adjustable hook-support O with the cross-brace rod between the two handles of the plow, substantially as described, and for the purpose set forth.

3. The combination of the curved body of the hook H with the eye and hook at either end, by means of which the hook can be lengthened or shortened, as described, and for the purpose set forth.

JOEL NOURSE.

Witnesses:
EDWIN A. HILDRETH,
GEORGE E. BURT.